United States Patent [19]

Huang

[11] Patent Number: 5,108,119
[45] Date of Patent: Apr. 28, 1992

[54] WHEELED CARRYING CASE

[76] Inventor: En Liung Huang, 1280 Price St., Pomona, Calif. 91767

[21] Appl. No.: 594,333

[22] Filed: Oct. 9, 1990

Related U.S. Application Data

[63] Continuation-in-part of Ser. No. 398,394, Aug. 25, 1989, abandoned.

[51] Int. Cl.$^5$ .......................... B62B 1/12; A45C 5/14
[52] U.S. Cl. .................... 280/37; 280/47.26; 190/18 A
[58] Field of Search ............ 280/37, 38, 39, 40, 280/652, 654, 655, 655.1, 47.24, 47.26, 47.315; 190/18 A, 15.1

[56] References Cited

U.S. PATENT DOCUMENTS

| | | | |
|---|---|---|---|
| Re. 28,757 | 4/1976 | Cassimally | 280/37 |
| D. 270,017 | 8/1983 | DiDonna | D3/76 |
| D. 276,052 | 10/1984 | Wedel et al. | D16/33 |
| D. 285,145 | 8/1986 | Hsieh | D3/76 |
| D. 286,705 | 11/1986 | Miles | D3/72 |
| D. 287,779 | 1/1987 | Slany | D34/25 |
| 2,313,884 | 3/1943 | Mattoon | 280/37 |
| 2,463,713 | 3/1949 | Partiot | 280/37 |
| 2,472,491 | 6/1949 | Quinton | 280/37 |
| 3,194,576 | 7/1965 | Kunkle | 280/47.26 X |
| 3,522,955 | 8/1970 | Warner, Jr. | 280/47.37 |
| 3,701,541 | 10/1972 | Tarducci et al. | 280/37 |
| 3,842,953 | 10/1974 | Royet | 190/18 A |
| 3,960,252 | 8/1976 | Cassimally | 190/18 A |
| 4,066,156 | 1/1978 | Basile | 190/18 A |
| 4,087,102 | 5/1978 | Sprague | 280/37 |
| 4,228,877 | 10/1980 | Cothary | 280/37 X |
| 4,254,850 | 3/1981 | Knowles | 190/18 A |
| 4,261,447 | 4/1981 | Arias et al. | 190/18 A |
| 4,273,222 | 6/1981 | Cassimally et al. | 190/18 A |
| 4,314,624 | 2/1982 | Royet | 190/18 A |
| 4,335,896 | 6/1982 | Koffler et al. | 280/47:17 |
| 4,340,132 | 7/1982 | Cerna | 190/18 A |
| 4,374,555 | 2/1983 | March | 190/48 |
| 4,411,343 | 10/1983 | Cassimally et al. | 190/18 A |
| 4,529,069 | 7/1985 | March | 190/114 |
| 4,550,813 | 11/1985 | Browning | 190/18 A |
| 4,575,109 | 3/1986 | Cowdery | 280/37 |
| 4,618,035 | 10/1986 | Mao | 280/37 X |
| 4,836,565 | 6/1989 | Catalo | 280/37 |
| 5,024,455 | 6/1991 | Schrecongost | 280/37 |
| 5,024,458 | 6/1991 | Kazmark | 280/655 X |

FOREIGN PATENT DOCUMENTS

| | | | |
|---|---|---|---|
| 3637424 | 5/1988 | Fed. Rep. of Germany | 190/15.1 |
| 899201 | 5/1945 | France | 280/654 |
| 2298977 | 8/1976 | France | 280/652 |
| 2617383 | 1/1989 | France | 190/15.1 |
| 697220 | 10/1965 | Italy | 280/37 |
| 1406272 | 9/1975 | United Kingdom | 280/40 |

Primary Examiner—Andres Kashnikow
Assistant Examiner—Brian L. Johnson
Attorney, Agent, or Firm—Cislo & Thomas

[57] ABSTRACT

A wheel-equipped carrying case can be carried by hand or rolled along the ground using an extensible U-shaped handle conveniently stored when not in use. The extensible handle slides through holes in substantially rigid end walls into a pair of storage tubes in the interior of the case. Wheels are rotatively attached to ends of the storage tubes extending beyond one end wall. For added stiffness each end wall includes a flange around the periphery of the wall with a groove therein. The grooves accommodate the free ends of the side and bottom walls of the case during assembly. In an alternative embodiment, the extensible handle telescopes into tubes mounted on the bottom of the case and wheels are attached to the end wall opposite the end wall through which the extensible handle projects. One or more pivotally mounted support frames on the bottom of the case wheels allow the case to rest in a level position when it is not being carried or rolled. In another alternative embodiment the extensible handle is stored within a larger-diameter tube mounted on the bottom of the case with four metal or two plastic brackets, and is capable of being locked in extended position by spring-loaded buttons which pop up through holes in the handle tubing and storage tubing when the handle is fully extended.

15 Claims, 5 Drawing Sheets

WHEELED CARRYING CASE

CROSS-REFERENCE TO RELATED APPLICATION

This application is a continuation-in-part of now abandoned application Ser. No. 07/398,394 filed Aug. 25, 1989 by En Liung Huang.

BACKGROUND OF THE INVENTION

This invention relates to a wheel-equipped carrying case which can either be carried by hand or rolled along the ground using an extensible handle which is normally stored inside the case.

There exists a need for a portable carrying case which can either be carried by hand or moved around by a person using self-contained mechanical assistance built into the case if the case becomes too heavy to carry. Such a portable carrying case would ideally be relatively light while having sufficient structural rigidity to accommodate heavy loads. At the same time an ideal carrying case would include a means of movement, such as wheels, which could be set in motion and steered by some appropriate structural member that ordinarily would be stowed inside the case when not in use. It would also be desirable that such a carrying case be attractive in appearance, durable, and economical to manufacture. A portable carrying case that could be either carried by hand or wheeled along the ground that meets the above requirements would be a great boon to the traveler, particularly to a salesman or sales representative, who is often required to transport heavy quantities of goods and/or promotional material with him in his travels.

SUMMARY OF THE INVENTION

It is an object of the present invention to provide a mobile carrying case with wheels so that the case can be either carried by hand or rolled along the ground.

It is another object of the present invention to provide a mobile carrying case with wheels and with an extensible handle for pulling or pushing and steering the case while it is being wheeled.

It is yet another object of the present invention to provide a mobile carrying case with substantially rigid end walls to accommodate the economical mounting of wheels and of an extensible handle.

Another object of the present invention is to provide a wheeled carrying case with an extensible handle which is stored within the case when the case is being carried by hand.

Still another object of the present invention is to provide a carrying case with end walls that have improved stiffness by virtue of grooves in flanges around the periphery of the walls into which the free edges of side and end walls are disposed to form a durable case construction.

Still an additional more specific object of the invention is to provide a mobile carrying case having wheels mounted on a bottom edge of one end wall beneath the case and having a frame support on the bottom edge of the other end wall, so that the case rests in a level position when partially supported by the wheels.

In accordance with the present invention in a preferred embodiment, a mobile carrying case has first and second substantially rigid end walls, through one of which the straight portions of an extensible U-shaped handle slide into a pair of storage tubes in the interior of the case when not in use. A pair of wheels are attached to the ends of the straight portions of the extensible handle where they extend through the other end wall. When the U-shaped handle is extended to its maximum length by withdrawing it from the interior of the case, it becomes possible to wheel the carrying case around while pulling or pushing it with the extensible handle.

In the preferred embodiment, the end walls each include a flange around the periphery of the wall, with the flange having a groove therein for added stiffness with respect to bending out of the plane in which the major portion of the wall lies. The grooves in the flanges of the end walls accommodate the free ends of the side and bottom walls of the carrying case, which fit into the grooves during assembly of the carrying case.

In a first alternative embodiment, the extensible handle telescopes into tubes attached underneath the bottom wall of the case. Two wheels are attached to a bottom edge of the end wall through which the extensible handle extends. One or more open, generally rectangular support frames on the outside of the bottom wall of the carrying case, having the same height as the wheels, allow the case to rest in a level position on the ground when the case is not being carried or rolled.

In a second alternative embodiment, the extensible handle telescopes into storage tubes attached by means of plastic or metal brackets to the underside of the bottom wall of the case. The handle can be locked into its extended configuration by means of spring-loaded buttons which pop up through holes in the storage tubes and the outer tubes forming part of the extensible handle.

DESCRIPTION OF THE PREFERRED EMBODIMENTS

Figure 1:
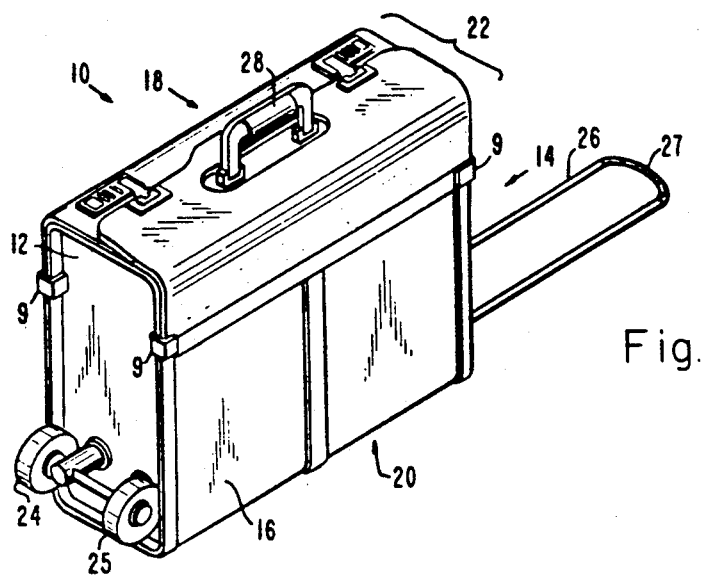
FIG. 1 is a perspective view of the mobile carrying case of the present invention with the extensible handle in its extended position.

Referring to the figures of drawings wherein like reference numerals designate like elements throughout, FIG. 1 depicts an embodiment of a mobile carrying case 10 of the invention. For ease of illustration and description, the drawings illustrate only the pertinent features of the present invention and do not show the remaining conventional features.

In this embodiment, a mobile carrying case 10 comprises a first end wall 12, a second end wall 14, a first side wall 16, a second side wall 18, a bottom wall 20, an openable top portion 22, wheels 24 and 25, an extensible handle 26 with end portion 27, and a handle for carrying 28. Walls 12, 14, 16, 18, and 20 define an interior volume 11 which can be closed off by top portion 22. End walls 12 and 14 are stitched or glued to side walls 16 and 18 and bottom wall 20. Top portion 22 of case 10 is stitched to side walls 16 and 18 on opposite sides of the case 10. Clips 9 at the four bottom corners of top portion 22 serve as structural reinforcements and to give a decorative effect.

Figure 2:
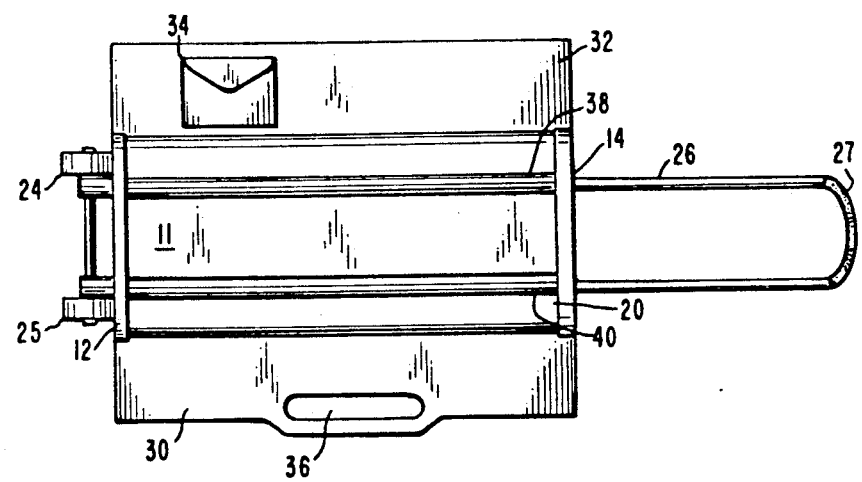
FIG. 2 is a top plan view of the carrying case of FIG. 1 in its opened configuration, showing the parallel storage tubes into which the extensible handle can be telescoped.

As shown in FIG. 2, top portion 22 of case 10 comprises a first flap 30 and a second opposed flap 32. Flaps 30 and 32 can be rotated or swung away from the body of the case 10 to expose the interior 11 of the case 10. Flap 32 is shown as having a small flat compartment or pocket 34 on its inner surface. Flap 30 has a cut-out portion 36 through which carrying handle 28 extends when case 10 is in its closed configuration.

Near the bottom wall 20 of the case 10, a first storage tube 38 and a second storage tube 40 span the length of the case 10 and extend through end walls 12 and 14. Storage tubes 38 and 40 are fixed to end wall 12 but extend slightly beyond it. The other ends of storage tubes 38 and 40 are held in place in end wall 14 with mounting hardware as described below. The straight portions of the U-shaped extendable handle 26 can be stowed inside the storage tubes 38 and 40 when it is desired to carry the case by hand using carrying handle 28.

Figure 3:
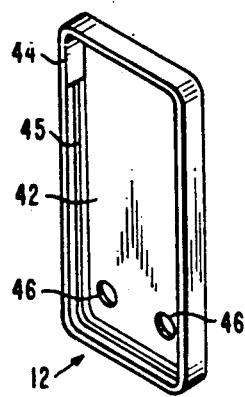
FIG. 3 is a perspective view, partly broken away, of the left end wall of the case shown in FIG. 1, detached from the case.

Referring to FIG. 3, end wall 12 has a generally flat planar portion 42 surrounded by a flange 44 with groove 45 in its back surface. First and second aligned holes 46 through the planar portion 42 of end wall 12 near its lower end accommodate mounting hardware which allows storage tubes 38 and 40 to be fixed in position relative to end wall 12.

Figure 4:
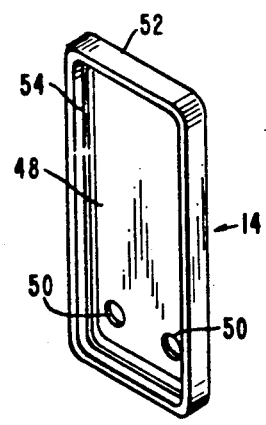
FIG. 4 is a perspective view of the right end wall of the case of FIG. 1, detached from the case and showing the peripheral groove in the flange of the wall.

Referring to FIG. 4, end wall 14, like its opposite counterpart, end wall 12, has a flat planar portion 48 through which first and second aligned holes 50 extend. Holes 50 accommodate hardware which holds the ends of storage tubes 38 and 40 into which extensible handle 26 telescopes. A peripheral flange 52 surrounds planar portion 48.

From FIG. 4 it is seen that a relatively deep groove 54 in flange 52 follows the contour of flange 52, corresponding to groove 45 in flange 44 of end wall 12. The grooved flanges of end walls 12 and 14 provide added rigidity with respect to torsion about any axis lying in the planar portions 42 or 48 of end walls 12 and 14 respectively. In construction of the carrying case 10, the end edges of side walls 16 and 18 and bottom wall 20 fit into the peripheral grooves 45 and 54 of end walls 12 and 14.

The walls of carrying case 10 may comprise a natural material such as leather or a synthetic material such as one of the various plastics commonly available for use in a variety of fabrication techniques. Side walls 16 and 18 may comprise one continuous piece of material that includes bottom wall 20. Side walls 16 and 18 and bottom wall 20 may be stitched or stitched and glued to end walls 12 and 14 after insertion into grooves 45 and 54. Flaps 30 and 32 may be stitched to side walls 18 and 20, respectively. The long straight portions of extensible handle 26 preferably comprise lightweight metal or plastic tubes which fit into corresponding stowing tubes 38 and 40 made of similar material, in telescopic fashion.

End portion 27 of U-shaped extensible handle 26 may have a rubber, leather, or plastic covering to provide a better grip to aid in pushing or pulling and steering carrying case 10 when it is being wheeled about.

End walls 12 and 14 are preferably constructed from a substantially rigid plastic material to provide structural strength to case 10 and also to provide sturdy structural members for the mounting of hardware to accommodate stowing tubes 38 and 40. End walls 12 and 14 may be formed in one piece in a plastic molding process.

Figure 5:
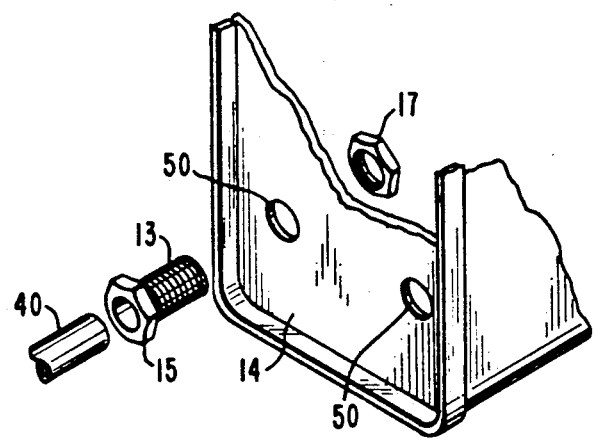
FIG. 5 is an exploded, fragmented view of the end wall through which the extensible handle slides, showing the hardware mounting details.

Referring to FIG. 5, the details of the mounting hardware used on end wall 14 can be seen. A threaded bushing 13 having a collar 15 is retained in end wall 14. The threaded portion of bushing 13 extends beyond the side of end wall 14 opposite the side abutting collar. 15. Retaining nut 17 is screwed onto threaded bushing 1 to hold it securely in place on wall 14. The free end of storage tube 40 is frictionally held inside bushing 13. A second threaded bushing 13 with collar portion 15 and an associated retaining nut 17 are used to hold the free end of storage tube 38 in the second hole 50 but are not shown in FIG. 5.

Figure 6:
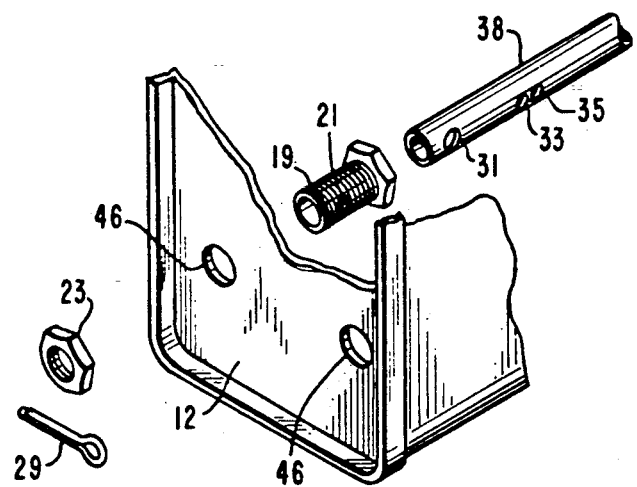
FIG. 6 is an exploded, fragmented view of the end wall through which the other end of the extensible handle passes, showing the mounting details.

Referring to FIG. 6, the details of mounting the other end of storage tube 38 to end wall 12 are shown. A bushing 19 with collar portion 21 fits into hole 46 in end wall 12. Threaded bushing 19 has a small hole 21 drilled completely through it along a diameter. Retaining nut 23 is screwed onto the threaded portion of bushing 19 past hole 21 so that cotter pin 29 can be inserted into hole 21. The free ends of cotter pin 29 can then be bent apart to prevent retaining nut 23 from coming loose. There are three holes through storage tube 38 near its end. Hole 31 accommodates an axle on which wheels 24 and 25 are mounted. Spaced-apart and aligned holes 33 and 35 permit the passage of cotter pins 29 to hold storage tube 38, bushing 19, and end wall 12 together. An identical set of mounting hardware components serves to hold the end of storage tube 40 in place (not shown).

Figure 7:
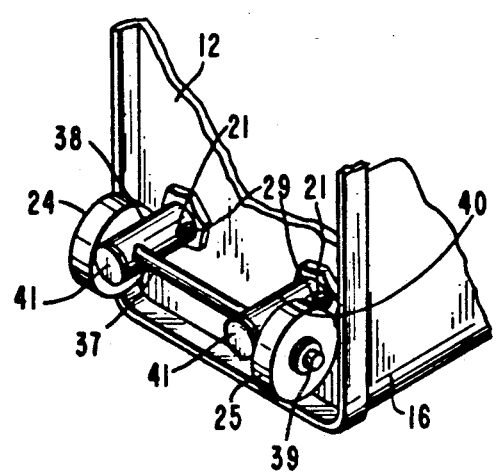
FIG. 7 is a fragmented perspective view of the wheel mounting arrangement.

Referring to FIG. 7, the arrangement for mounting wheels 24 and 25 can be seen. An axle 37 passes through holes 31 in storage tubes 38 and 40. Wheels 24 and 25 are mounted on the ends of axle 37 and kept from slipping off by retaining caps 39. End plugs 41 seal off the ends of storage tubes 38 and 40.

Figure 8:
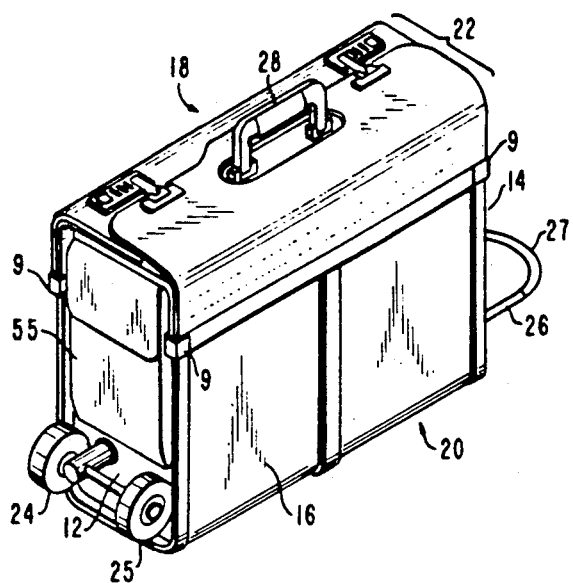
FIG. 8 is a perspective view of the carrying case of FIG. 1 with the extensible handle in its stowed configuration.

As shown in FIG. 8, most of the extensible handle 26 is normally kept stored in the interior 11 of carrying case 10. The storage tubes 38 and 40, into which the straight portions of extensible handle 26 are telescoped, occupy only a small fraction of the interior volume 11 of case 10 near bottom wall 20. Also shown in FIG. 8 is an optional storage pocket 55 on the outside of end wall 12. A similar pocket can be provided on end wall 14 (not seen in FIG. 4).

Figure 9:
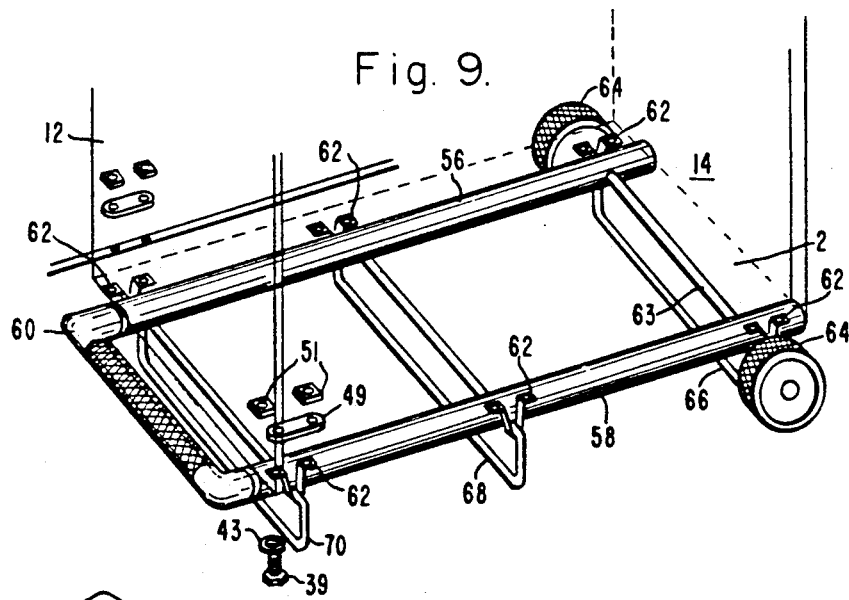
FIG. 9 is a fragmented perspective view of an alternative embodiment of the invention in which wheels and a support frame are mounted on the bottom edges of the end walls, and the extensible handle telescopes into storage tubes mounted on the bottom wall.

An alternative embodiment of the wheel and extensible handle arrangement is shown in FIG. 9. Storage tubes 56 and 58, along with extensible handle 60 stored for the most part in tubes 56 and 58, provide a support frame which is attached beneath bottom wall 20 to end walls 12 and 14 by means of brackets 62. In this alternative embodiment there is no need for apertures through end walls 12 and 14. Brackets 62 also provide a means of attaching wheels 64 and 65 as well as support frame members 66, 68, and 70.

Various methods of attaching brackets 62 to end walls 12 and 14 and bottom wall 20 are known in the art. For example, screws 39 inserted through washers 43 and through holes in brackets 62 and washer plates 49 can be held in place by screwed-on and tightened nuts 51.

Wheels 64 and 65 are rotatively mounted on axle 63 forming part of support frame member 66. Support frame members 68 and 70 are tubes or rods in the shape of a quadrilateral. As shown in FIG. 9, a rectangular shape is one possibility. Other shapes would include various trapezoids.

The function of support frame members 68 and 70 is to keep carrying case 10 level when it is resting on wheels 64 and 65. Support frame members 68 and 70 can be pivoted or folded to lie flat against the underside of storage tubes 56 and 58. This alternative embodiment of the extensible handle arrangement has the advantage that it is exterior to the internal volume of case 10, so that additional space is available for use inside the case.

Figure 10:
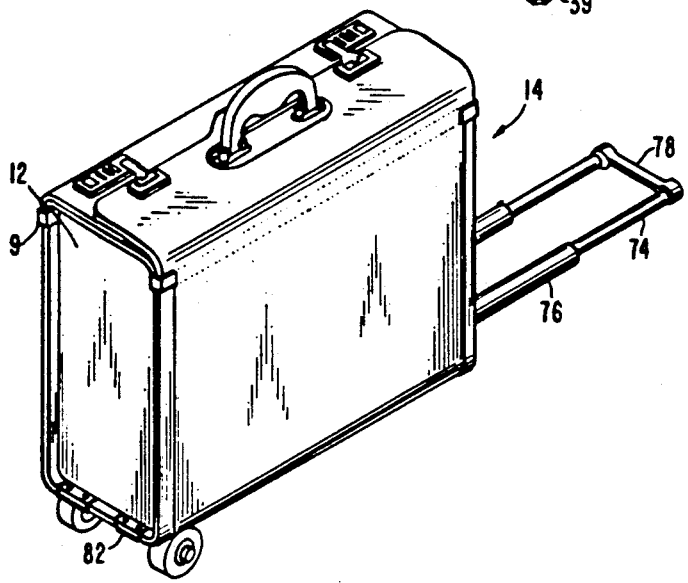
FIG. 10 is a perspective view of another alternative embodiment of the invention.

A second alternative embodiment is depicted in the perspective view of FIG. 10. Extensible handle 72 comprises first and second straight tube portions 74 and 76, respectively, with a cross-bar handle piece 78 secured to the ends of first straight tube portions 74. First straight tube portions 74 telescope into second straight tube portions 76, which are of larger diameter.

Figure 11:
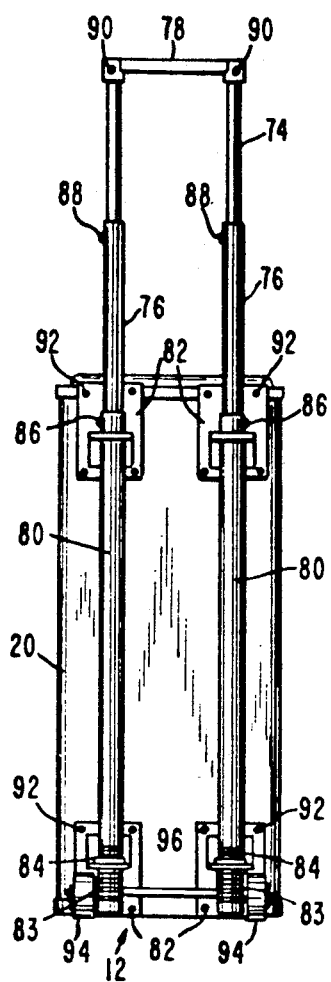
FIG. 11 is a bottom plan view of the other alternative embodiment of the invention shown in FIG. 10.
Figure 12:
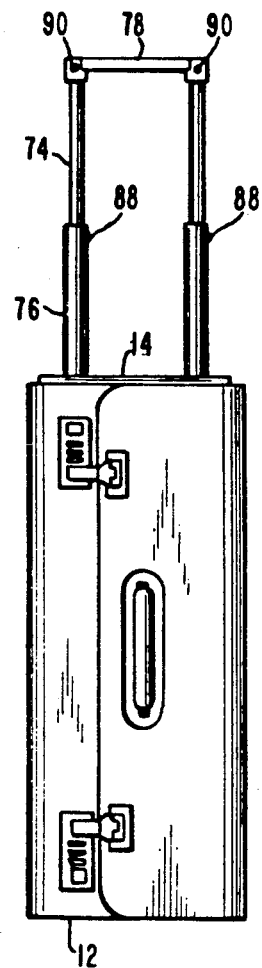
FIG. 12 is a top plan view of the other alternative embodiment of the invention shown in FIG. 10.
Figure 15:
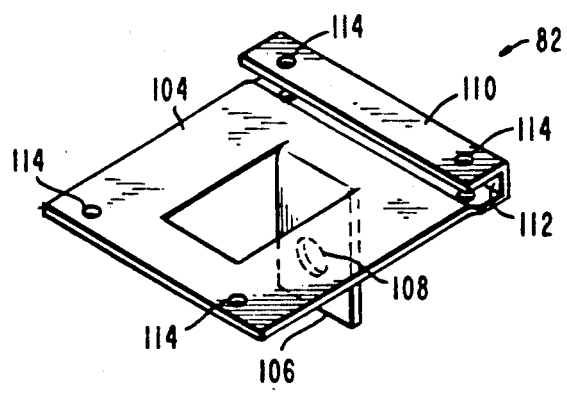
FIG. 15 is a perspective view of one of the four metal mounting brackets used in the embodiment of the invention shown in FIG. 10.

As seen in FIG. 11, tube portions 74 and 76 telescope into storage tubes 80 mounted on bottom wall 20 by means of four metal brackets 82 (pictured in detail in FIG. 15). The ends 83 of storage tubes 80 near end wall 12 are threaded and inserted through holes in portions of brackets 82 at right angles to the plane of bottom wall 20 and fixed in position by means of pairs of locknuts 84 threaded onto the ends 83 of storage tubes 80 and tightened against the hole-bearing portions of brackets 82 The ends of storage tubes 80 near end wall 14 extend through holes in brackets 82 located at end wall 14.

Extensible handle 72 can be locked into its extended configuration by means of first and second pairs of spring-loaded buttons 86 and 88, respectively, which pop up through holes in the sides of storage tubes 80 and second straight tube portions 76, respectively. Handle portion 78 is preferably fixed to the ends of straight tube portions 74 by means of pins 90.

To return straight tube portions 74 to their stored positions inside second straight tube portions 76, finger pressure is applied to depress buttons 88 while force is applied to handle 78 toward case 10. (Similarly depressing spring-loaded buttons 86 while continuing to apply force to handle 78 directed toward end wall 14 results in the telescoping of second straight tube portions 76 into storage tubes 80.

Brackets 82 can be attached to case 10 by rivets 92, or by a bolt-and-nut arrangement. Wheels 94 are rotatively mounted on a rod 96 transversely inserted through pairs of aligned holes in the threaded ends 83 of storage tubes 80. Plastic caps 98 cover the ends of the threaded portions 83 of storage tubes 80.

Figure 13:
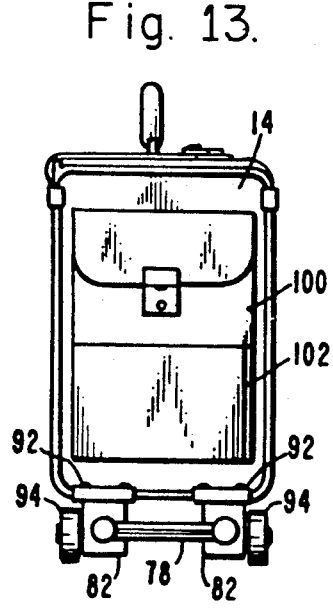
FIG. 13 is a right end elevational view of the other alternative embodiment of the invention shown in FIG. 10.
Figure 14:
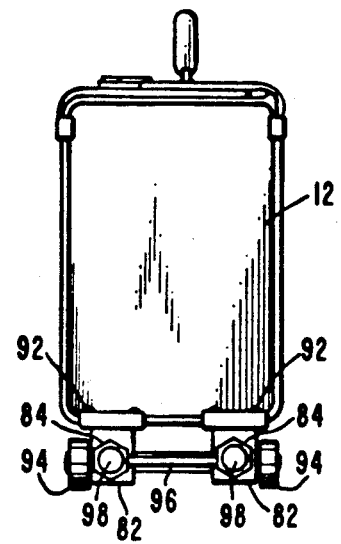
FIG. 14 is a left end elevational view of the other alternative embodiment of the invention shown in FIG. 10.

As shown in FIG. 13, a closeable compartment 100 with an open pocket 102 is attached to end face 14 of case 10 in the second alternative embodiment. FIG. 14 is a left end elevational view of the embodiment shown in FIG. 10.

As shown in FIG. 15, each bracket 82 comprises a substantially planar body portion 104 with a central part 106 bent out of the plane to a position 90 degrees thereto. Portion 106 has a central hole 108 to accommodate the passage of a storage tube 80 therethrough. An end portion 110 comprises a channel 112 designed to fit into the bottom edge of flange 44 or flange 52 on end wall 12 or end wall 14, respectively. Four holes 114 are provided in body portion 104 and end part 110 to allow attachment of bracket 82 to case 10 by means of rivets or bolts and nuts.

The type of bracket 82 shown in FIG. 15 is preferably made of metal and fabricated through standard stamping and bending processes. Two such metal brackets are designed to be mounted at each end of case 10, as is particularly clearly shown in FIG. 11.

Figure 16:
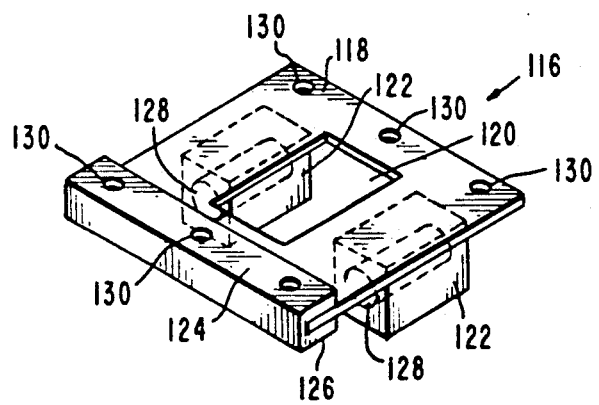
FIG. 16 is a top perspective view of an alternative type of plastic mounting bracket, two of which can be used to replace the four brackets shown in the embodiment of the invention shown in FIG. 10.
Figure 17:
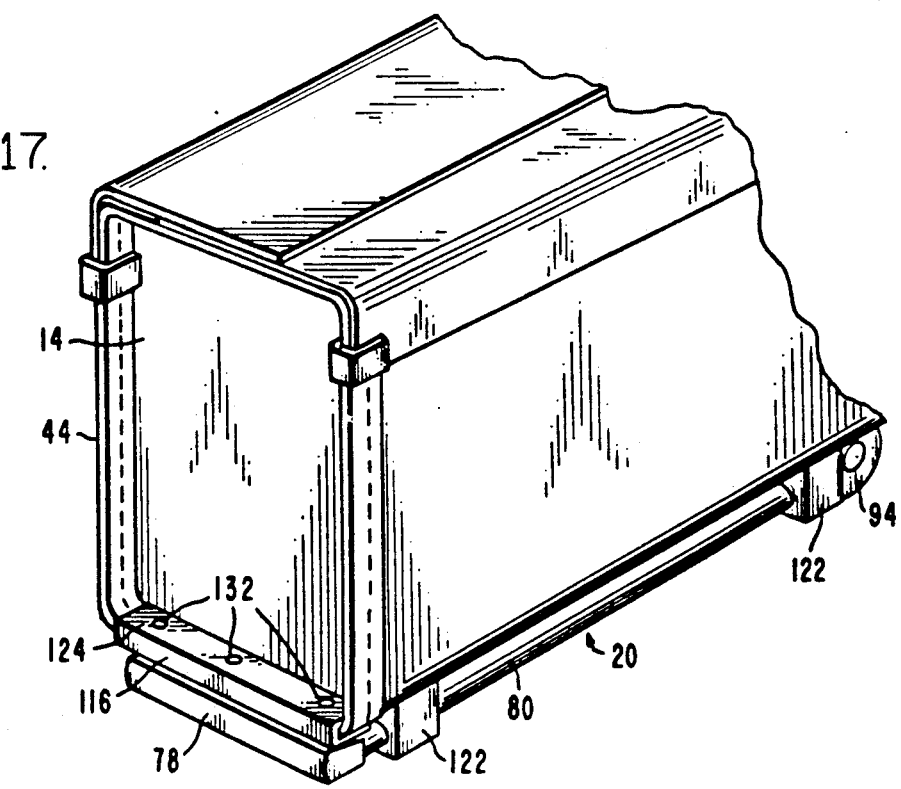
FIG. 17 is a fragmentary perspective view of one end of the carrying case with the mounting bracket of FIG. 16 mounted on the case.

An alternative type of mounting bracket 116 for mounting storage tubes 80 and the extensible handle to the bottom and end walls of case 10 is shown in FIG. 16. Bracket 116 comprises a generally planar body portion 118 with a central rectangular cut-out 120, a pair of guide blocks 122, and an end part 124. End part 124 comprises a channel 126 which fits over the bottom sides of flanges 44 and 52 on end wall 12 or end wall 14, respectively. Guide blocks 122 have through holes 128 large enough to accommodate storage tubes 80 for mounting thereof. Six holes 130 are provided for mounting bracket 116 to the bottom and end walls of case 10. Bracket 116 is preferably made from a strong, lightweight plastic material by an economical fabrication process such as injection molding. The width of bracket 116 is sufficient to allow the mounting of both storage tubes 30, thereby reducing the necessary number of mounting brackets to two. As shown in FIG. 17, bracket 116 of the type shown in FIG. 16 is mounted on flange 44 and bottom wall 20 of case 10 by means of fastening devices 132 which could be rivets, for example.

The mobile carrying case of the present invention is thus seen to provide a strong and lightweight case which can either be carried by hand or rolled along the ground when the contents become uncomfortably heavy to carry. In operation as a rolling case, the end portion of the extensible handle is gripped with one hand, the extensible portion is pulled out of its storage tubes and locked into position, the case is handle is more nearly vertical, and the case is rolled along the ground by pushing or pulling on the extensible handle.

It should be understood that the invention in its broader aspects is not limited to the specific embodiments shown and described herein, but departures may be made therefrom within the scope of the appended claims without departing from the principles of the invention and without sacrificing its chief advantages. For example, there are a variety of different means of attaching the wheels 24,25 or 64,65 to the ends of storage tubes 38 and 40, or to end walls 12 and 14, respectively, which are known in the art. Similarly, various well-known methods can be employed to link the extensible handle 26 or 60 and the storage tubes 38,40 or 56,58 into which it telescopes. Also, there is a choice of several different ways to attach storage tubes 38 and 40 to end wall 12. All such modifications and changes will make themselves apparent to those of ordinary skill in the art and all such changes and modifications are intended to be covered by the appended claims.

What is claimed is:

1. A portable carrying case comprising in combination:

first and second end walls, first and second side walls, a top wall, and a bottom wall defining an interior cavity, said bottom and end walls having first and second parallel spaced-apart storage tubes attached thereto, said case having mounting means for mounting said storage tubes, a pair of extensible members disposed in said spaced-apart storage tubes and having a first terminus and a second terminus, said first terminus being configured in a handle configuration and said first and second storage tubes having first and second spaced-apart wheels rotatably connected thereto, respectively, at an end opposite said first terminus, said extensible members being adapted to be received within said storage tubes;

wherein each of said extensible members comprises first and second straight tube segments, said first segment telescopically receiving said second segment in operative relation thereto, wherein said first and second segments can be locked into extended positions by spring-loaded buttons transversely housed in said first and second tube segments, wherein said buttons are allowed to project through holes of corresponding diameter and circumferential position in said storage tubes and said second straight tube segments when said first and second straight tube segments are extended;

wherein each of said end walls comprises a substantially planar sheet of rigid material with a transversely projecting rim portion and having an interiorly directed groove which receives a free edge of said side and bottom walls; and wherein said mounting means includes two pairs of brackets, one pair mounted on said case at said first end wall and one pair mounted on said case at said second end wall, each said bracket comprising a generally planar body portion with a central part cut on three sides and bent to a position 90 degrees away from said planar portion, said bent central part having a hole therein of sufficient diameter to allow passage of one of said storage tubes therethrough, said bracket further having an end portion closest to said bent central part and defining an inwardly facing channel, each said bracket having a plurality of mounting holes through said bracket for mounting said bracket to said case and said mounting means further comprising first and second means for securing said storage tubes in said mounting brackets.

2. The carrying case of claim 1 wherein a first end of each said storage tube includes a threaded external portion and each said means for securing said storage tubes in said mounting brackets comprises first and second locknuts on said threaded portion on opposite sides of said bent central part of said bracket.

3. The carrying case of claim 1 wherein each said mounting bracket comprises a metallic material.

4. A portable carrying case comprising the combination of:

first and second spaced-apart, substantially rigid end walls; first and second spaced-apart side walls disposed between said end walls, and being connected thereto;

a bottom wall disposed between said first and second end walls and disposed between said first and second side walls, and connected thereto;

said side, end, and bottom walls defining an interior volume between said walls;

openable top means connected to at least one of said side walls for closing off said interior volume;

first and second parallel, spaced-apart storage tubes attached to said bottom wall of said case and having first and second ends, with first and second spaced-apart wheels rotatively connected to said second ends of said tubes, respectively; and extensible means in said storage tubes having a first handle end and a second opposed end near said second ends of said tubes;

wherein said extensible means includes a handle portion outside said storage tubes and a second, extensible portion normally telescopically stored inside said storage tubes when said case is being carried, and capable of being lockably extended outside said storage tubes for rolling said case;

wherein each of said extensible members comprises first and second straight tube segments, said first segment telescopically receiving said second segment in operative relation thereto, wherein said second segment terminates in said handle portion and said first and second segments can be locked into extended positions by spring-loaded buttons transversely housed in said first and second tube segments, wherein said buttons are allowed to project through holes of corresponding diameter and circumferential position in said storage tubes and said second straight tube segments when said first and second straight tube segments are extended;

wherein each of said end walls comprises a substantially planar sheet of rigid material with a transversely projecting rim portion and having an interiorly directed groove which receives a free edge of said side and bottom walls; and wherein said mounting means includes two pairs of brackets, one pair mounted on said case at said first end wall and one pair mounted on said case at said second end wall, each said bracket comprising a generally planar body portion with a central part cut on three sides and bent to a position 90 degrees away from said planar portion, said bent central part having a hole therein of sufficient diameter to allow passage of one of said storage tubes therethrough, said bracket further having an end portion closest to said bent central part and defining an inwardly facing channel, each said bracket having a plurality of mounting holes through said bracket for mounting said bracket to said case, and said mounting means further comprising first and second means for securing said storage tubes in said mounting brackets.

5. The carrying case of claim 4 wherein a first end of each said storage tube includes a threaded external portion and each said means for securing said storage tubes in said mounting brackets comprises first and second locknuts on said threaded portion on opposite sides of said bent central part of said bracket.

6. The carrying case of claim 4 wherein each said mounting bracket comprises a metallic material.

7. The carrying case of claim 4 further comprising carrying means for carrying said case by hand which is attached to said top wall.

8. The carrying case of claim 4 wherein said end walls have exterior faces and further comprising at least one compartment means on said exterior faces of said first and second end walls.

9. The carrying case of claim 4 wherein said first and second spaced-apart wheels are rotatively mounted on an axle passing through said second ends of said storage tubes.

10. A portable carrying case comprising the combination of:

first and second spaced-apart, substantially rigid end walls; first and second spaced-apart side walls disposed between said end walls, and being connected thereto;

a bottom wall disposed between said first and second end walls and disposed between said first and second side walls, and connected thereto;

said side, end, and bottom walls defining an interior volume between said walls;

openable top means connected to at least one of said side walls for closing off said interior volume;

first and second parallel, spaced-apart storage tubes attached to said bottom wall of said case and having first and second ends, with first and second spaced-apart wheels rotatively connected to said second ends of said tubes, respectively; and extensible means in said storage tubes having a first handle end and a second opposed end near said second ends of said tubes;

wherein said extensible means includes a handle portion outside said storage tubes and a second, extensible portion normally telescopically stored inside said storage tubes when said case is being carried, and capable of being lockably extended outside said storage tubes for rolling said case;

wherein each of said extensible members comprises first and second straight tube segments, said first segment telescopically receiving said second segment in operative relation thereto, wherein said second segment terminates in said handle portion and said first and second segments can be locked into extended positions by spring-loaded buttons transversely housed in said first and second tube segments, wherein said buttons are allowed to project through holes of corresponding diameter and circumferential position in said storage tubes and said second straight tube segments when said first and second straight tube segments are extended;

wherein each of said end walls comprises a substantially planar sheet of rigid material with a transversely projecting rim portion and having an interiorly directed groove which receives a free edge of said side and bottom walls; and wherein said mounting means includes a pair of brackets, one said bracket mounted on said case at said first end wall and one said bracket mounted on said case at said second end wall, each said bracket comprising a generally planar body portion with a central cutout part, with first and second spaced-apart generally parallelipipedal mounting blocks extending from said planar body portion on opposite sides of said central cutout part, each said block having a hole therein of sufficient diameter to allow passage of one of said storage tubes therethrough, said bracket further having an end portion closest to said central cutout part and defining an inwardly facing channel, with a plurality of mounting holes through said bracket for mounting said bracket to said bottom wall and one of said end walls of said case.

11. The carrying case of claim 10 wherein said second end of each said storage tube includes a threaded external portion and each said means for securing said storage tubes in said mounting brackets comprises first and second locknuts on said threaded portion on opposite sides of said mounting block of said bracket.

12. The carrying case of claim 10 wherein each said mounting bracket comprises a plastic material.

13. The carrying case of claim 10 further comprising carrying means for carrying said case by hand which is attached to said top wall.

14. The carrying case of claim 10 wherein said end walls have exterior faces and further comprising at least one compartment means on said exterior faces of said first and second end walls.

15. The carrying case of claim 10 wherein said first and second spaced-apart wheels are rotatively mounted on an axle passing through said second ends of said storage tubes.

* * * * *